United States Patent
Tatebe et al.

(10) Patent No.: US 12,221,176 B2
(45) Date of Patent: Feb. 11, 2025

(54) ELECTRIC POWER STEERING DEVICE

(71) Applicant: SUBARU CORPORATION, Tokyo (JP)

(72) Inventors: Takanori Tatebe, Tokyo (JP); Shunsuke Watanabe, Tokyo (JP); Toshikuni Nagatani, Tokyo (JP); Masatsugu Suzuki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 253 days.

(21) Appl. No.: 17/849,251

(22) Filed: Jun. 24, 2022

(65) Prior Publication Data

US 2023/0001980 A1    Jan. 5, 2023

(30) Foreign Application Priority Data

Jul. 4, 2021 (JP) ................. 2021-111175

(51) Int. Cl.
*B62D 5/04* (2006.01)
(52) U.S. Cl.
CPC ......... *B62D 5/0463* (2013.01); *B62D 5/0481* (2013.01)
(58) Field of Classification Search
CPC .. B62D 5/0463; B62D 5/0481; B62D 5/0484; B62D 5/0409; B60R 16/033
See application file for complete search history.

(56) References Cited

U.S. PATENT DOCUMENTS

2017/0166145 A1   6/2017 Kinoshita et al.
2017/0313349 A1*  11/2017 Sugiyama ............. B60R 16/033

FOREIGN PATENT DOCUMENTS

| JP | 2008-184084 A | 8/2008 |
| JP | 2009-12665 A | 1/2009 |
| JP | 2016-72764 A | 5/2016 |

* cited by examiner

*Primary Examiner* — Brian P Sweeney
(74) *Attorney, Agent, or Firm* — TROUTMAN PEPPER HAMILTON SANDERS LLP

(57) ABSTRACT

An electric power steering device includes a motor, a motor controller, first and second power source circuits, a power source switching circuit, and a voltage detector. The power source switching circuit is configured to switch between a first state in which the motor controller receives electric power from the first power source circuit but is cut off from the second power source circuit, and a second state in which the motor controller receives electric power from the second power source circuit but is cut off from the first power source circuit. The voltage detector is configured to detect the voltage of the first power source circuit. The power source switching circuit is configured to select the second state in a case where the voltage of the first power source circuit is less than or equal to a predetermined value, and select the first state in cases other than the case.

4 Claims, 4 Drawing Sheets

ELECTRIC POWER STEERING DEVICE

CROSS-REFERENCE TO RELATED APPLICATION

The present application claims priority from Japanese Patent Application No. 2021-111175 filed on Jul. 4, 2021, the entire contents of which are hereby incorporated by reference.

BACKGROUND

The disclosure relates to an electric power steering device provided in a vehicle such as an automobile.

An electric power steering device provided in a vehicle such as an automobile imparts an assist force with an electric actuator such as a motor to a steering device that steers a steerable wheel.

As a technology related to an electric power steering device, Japanese Unexamined Patent Application Publication (JP-A) No. 2008-184084, for example, describes a vehicular driving control device configured to control the driving of an assist motor in an electric power steering system. The vehicular driving control device is supplied, at a normal time, with electric power from a second power system that is energized when the ignition switch is on and is supplied with electric power from a first power system in the period after the ignition switch is turned off until a predetermined shutdown process is completed.

JP-A No. 2009-12665 describes selecting, when the power supply voltage of a control arithmetic unit configured to control, based on a steering torque, the driving of an electric motor enters a low-voltage state, a battery voltage and an ignition voltage as power sources for supplying power to the control arithmetic unit, and selecting, when the low-voltage state is not detected, the battery voltage alone as the power source for supplying power to the control arithmetic unit.

JP-A No. 2016-72764 indicates providing a recovery relay for ensuring that power is fed to an electric power steering device and the like in an abnormal situation in which the ignition relay is stuck open.

SUMMARY

An aspect of the disclosure provides an electric power steering device including a motor, a motor controller, first and second power source circuits, a power source switching circuit, and a voltage detector. The motor is configured to impart an assist force to a steering device that is to steer a steerable wheel of a vehicle. The motor controller is configured to control the output of the motor. The first power source circuit is configured to supply electric power from a power source to at least one electric load other than the motor controller when a main power source of the vehicle is on. The second power source circuit is configured to supply electric power continually from the power source to the motor. The power source switching circuit is configured to switch between a first state and a second state. In the first state, electric power is supplied from the first power source circuit to the motor controller, and the second power source circuit and the motor controller are cut off from one another. In the second state, electric power is supplied from the second power source circuit to the motor controller, and the first power source circuit and the motor controller are cut off from one another. The voltage detector is configured to detect the voltage of the first power source circuit. The power source switching circuit is configured to select the second state in a case where the voltage of the first power source circuit is less than or equal to a predetermined value, and select the first state in cases other than the case.

An aspect of the disclosure provides an electric power steering device including a motor, a motor controller, first and second power source circuits, a power source switching circuit, and a current detector. The motor is configured to impart an assist force to a steering device that is to steer a steerable wheel of a vehicle. The motor controller is configured to control the output of the motor. The first power source circuit is configured to supply electric power from a power source to at least one electric load other than the motor controller when a main power source of the vehicle is on. The second power source circuit is configured to supply electric power continually from the power source to the motor. The power source switching circuit is configured to switch between a first state and a second state. In the first state, electric power is supplied from the first power source circuit to the motor controller, and the second power source circuit and the motor controller are cut off from one another. In the second state, electric power is supplied from the second power source circuit to the motor controller, and the first power source circuit and the motor controller are cut off from one another. The current detector is configured to detect the operating current of the motor. The power source switching circuit is configured to select the first state in a case where the operating current of the motor is less than or equal to a predetermined value, and select the second state in cases other than the case.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

It is desirable to accurately control the driving current of the motor in an electric power steering device over a wide range from a large current region of, for example, approximately 100 A to a micro-current region of, for example, approximately a few mA, which is used to make steering adjustments when driving in a straight line, for instance.

In one example, the micro-current region is commonly used during the normal driving of a vehicle, and therefore is a region in which the driver is sensitive to how steering feels, and acts as a point for giving a good or bad impression of how steering feels.

However, with a circuit configuration capable of covering large currents, stable control in the micro-current region may be difficult in some cases.

For example, among sensors that monitor the operating current of a motor, sensors that cover large currents may have insufficient resolution and the sensing performance may be inadequate for issuing control instructions in the micro-current region, which has possibilities that the stability and precision of control are impaired and steering feels unnatural.

In light of the above issues, it is desirable to provide an electric power steering device with an improved feel of steering in the region of very small motor operating currents.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Hereinafter, a first embodiment of an electric power steering device to which the disclosure is applied will be described.

The electric power steering device of the embodiment imparts a steering assist force with an electric motor to a steering device that steers the front wheels of an automobile such as a passenger car, for example.

Figure 1:
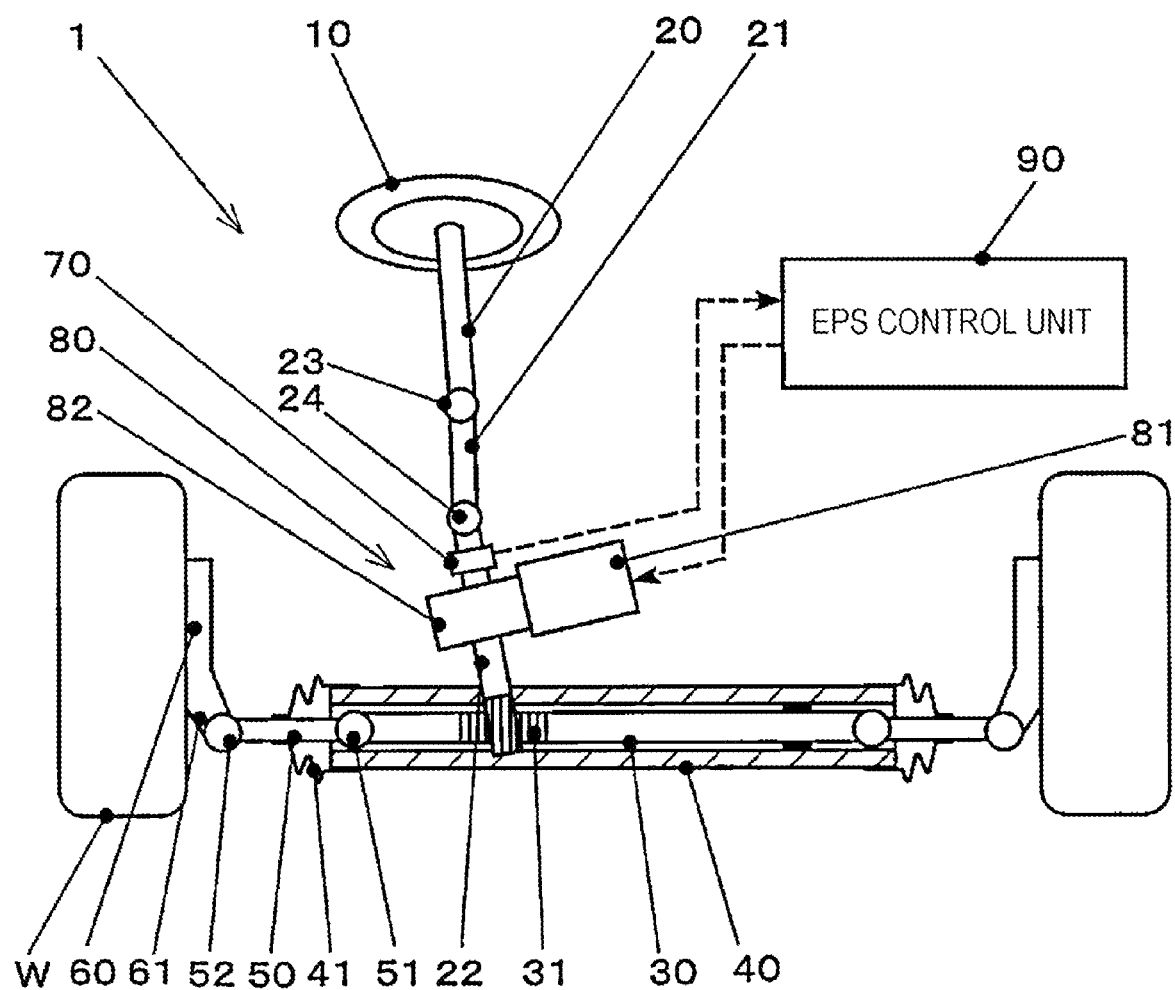
FIG. 1 is a diagram schematically illustrating a configuration of an embodiment of an electric power steering device to which an embodiment of the disclosure is applied.

FIG. 1 is a diagram schematically illustrating a configuration of the electric power steering device of the first embodiment.

An electric power steering device 1 includes a steering wheel 10, a steering shaft 20, an intermediate shaft 21, a pinion shaft 22, a rack 30, a rack housing 40, a tie rod 50, a housing 60, a torque sensor 70, an actuator unit 80, an electric power steering control unit (EPS control unit) 90, and the like.

The steering wheel 10 is an annular steering member that can be rotated by a driver to input steering operations.

The steering wheel 10 is disposed facing the driver's seat in the cabin of a vehicle.

The steering shaft 20 is a rotating shaft with one end attached to the steering wheel 10, and transmits the rotational movement of the steering wheel 10 to a rack and pinion mechanism configured to convert the rotational motion into translational motion in the vehicle width direction.

The intermediate shaft 21 and the pinion shaft 22 are coupled to the end of the steering shaft 20 on the opposite side from the steering wheel 10.

Universal joints (Cardan joints) 23 and 24, which can transmit rotation while the shafts are inclined to each other, are provided respectively between the steering shaft 20 and the intermediate shaft 21 and between the intermediate shaft 21 and the pinion shaft 22.

On the leading end of the pinion shaft 22, a pinion gear configured to mesh with a rack gear 31 of the rack 30 and thereby drive the rack 30 is formed.

The rack 30 is a columnar member disposed such that the longitudinal direction (axial direction) thereof lies in the vehicle width direction.

The rack 30 is supported so as to allow translational motion in the vehicle width direction relative to the vehicle body.

The rack gear 31 configured to mesh with the pinion gear of the pinion shaft 22 is formed in a portion of the rack 30.

The rack 30 is translated (moved straight) in the vehicle width direction when the rack gear 31 is driven by the pinion gear in response to the rotation of the steering shaft 20.

The rack gear 31 is disposed off-center on the left or right side (normally the driver's side) in the vehicle width direction.

For example, in the case where the vehicle is what is called a right-hand drive car in which the front seat on the right side is the driver's seat, the rack gear 31 is disposed to the right of center when in a neutral position.

The rack housing 40 is a substantially cylindrical member that houses and supports the rack 30 to allow relative displacement of the rack 30 in the vehicle width direction.

Rack boots 41 are provided on both ends of the rack housing 40.

The rack boots 41 are members that prevent foreign substances such as dust from entering the rack housing 40, while allowing relative displacement of the tie rod 50 with respect to the rack housing 40.

The rack boots 41 are formed into a flexible pleated tube shape using a resinous material such as an elastomer, for example.

The tie rod 50 is a shaft-shaped linking member that couples the end of the rack 30 with a knuckle arm 61 of the housing 60 and causes the housing 60 to rotate about a kingpin axis in association with the translational motion of the rack 30.

The end of the tie rod 50 on the inner side in the vehicle width direction is swingably coupled to the end of the rack 30 through a ball joint 51.

The end of the tie rod 50 on the outer side in the vehicle width direction is coupled to the knuckle arm 61 of the housing 60 through a ball joint 52.

At the connection point between the tie rod 50 and the ball joint 52, a turnbuckle mechanism for toe-in adjustment is provided.

The housing (knuckle) 60 is a member that houses a hub bearing configured to support a wheel W so as to allow the wheel W to rotate about an axle.

The housing 60 includes the knuckle arm 61 formed to project ahead or behind the axle.

The housing 60 is supported rotatably about a predetermined central axis of rotation, namely a kingpin axis.

In the case where the front suspension of the vehicle is a MacPherson strut, for example, the kingpin axis is a virtual axis joining the bearing center of a strut top mount to the center of the ball joint coupling the lower part of the housing 60 with a transverse link (lower arm).

The housing 60 revolves about the kingpin axis in response to being pushed or pulled in the vehicle width direction by the rack 30 through the tie rod 50, and thereby steers the wheels W.

The torque sensor 70 is a sensor configured to detect a torque acting on the pinion shaft 22.

The torque sensor 70 is provided in a portion of the pinion shaft 22, the portion being closer to the intermediate shaft 21 than the actuator unit 80.

The output from the torque sensor 70 is transmitted to the electric power steering control unit 90.

The actuator unit 80 is a driving device configured to rotationally drive the pinion shaft 22 to provide power assistance during manual driving and to perform steering operations during autonomous driving.

The actuator unit 80 includes a motor 81, a gearbox 82, and the like.

The motor 81 is an electric actuator configured to generate a driving force to be imparted to the steering shaft 20.

The rotation direction and the output torque of the motor 81 are controlled by the electric power steering control unit 90.

The gearbox 82 is provided with a reduction gear train configured to transfer the rotary output from the motor 81 to the pinion shaft 22 while reducing the speed (increasing the torque).

The electric power steering (EPS) control unit 90 is a control device configured to issue command values regarding the rotation direction and the output torque to the motor 81. In one embodiment, the control device may serve as a "motor controller".

When the vehicle is being driven manually, the electric power steering control unit 90 sets the command values to be issued to the motor 81 based on the torque input direction and detected torque value from the torque sensor 70.

Figure 2:
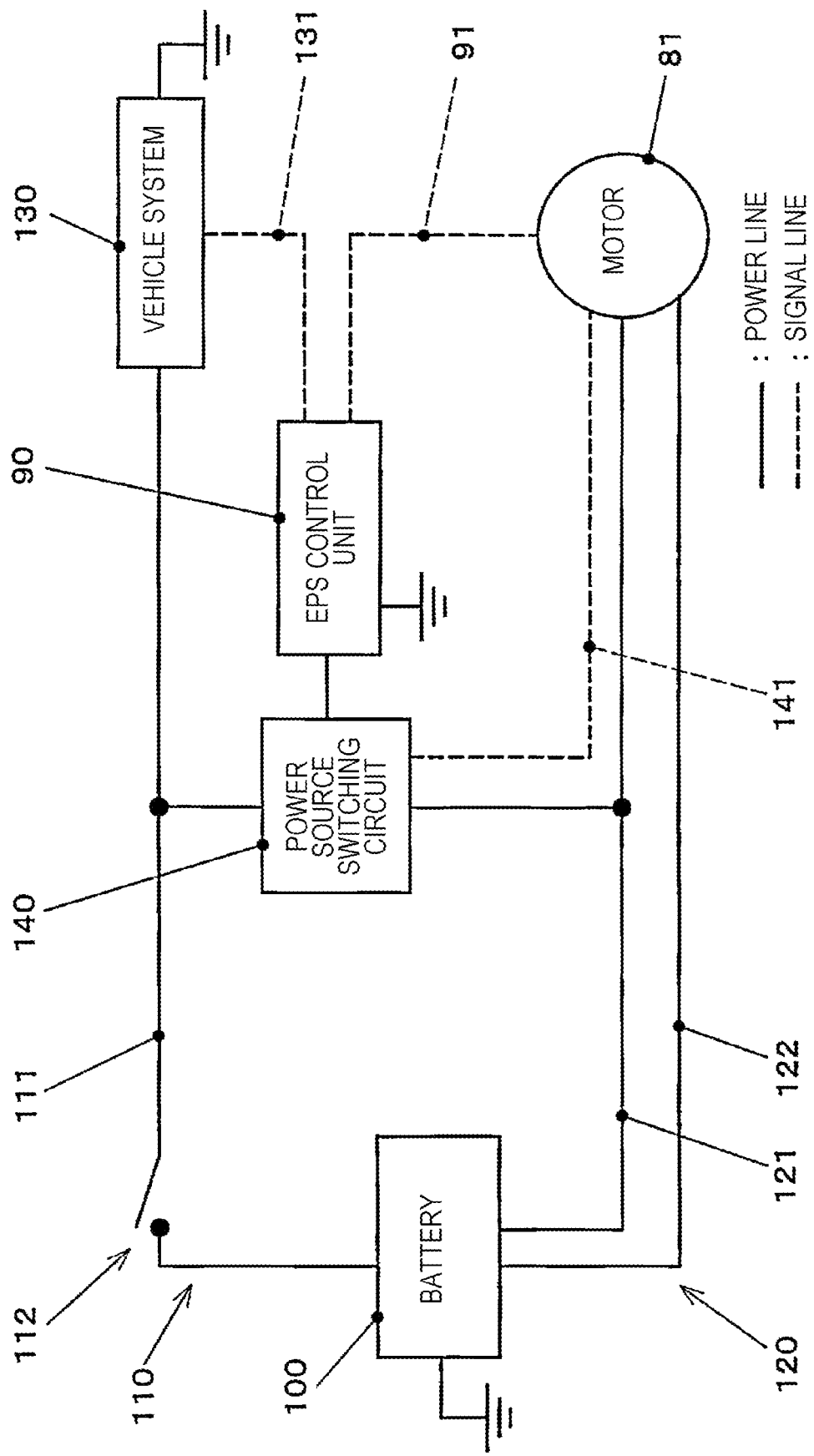
FIG. 2 is a diagram schematically illustrating a circuit configuration in the electric power steering device of the embodiment.

The electric power steering control unit 90 transmits the command values to the motor 81 through a signal line 91 (refer to FIG. 2).

FIG. 2 is a diagram schematically illustrating a circuit configuration in the electric power steering device of the first embodiment.

The circuit includes a battery 100, a first power source circuit 110, a second power source circuit 120, a vehicle system 130, a power source switching circuit 140, and the like.

The battery 100 is a secondary cell configured to supply electric power to various electric components installed in the vehicle. In one embodiment, the electric components may serve as "electric loads".

A lead storage battery, a nickel-metal hydride battery, a lithium-ion battery, or the like having a voltage rating approximately from 12 V to 48 V can be used as the battery 100, for example.

The plus terminal of the battery 100 is connected with a plus power line 111 of the first power source circuit 110 and a plus power line 121 of the second power source circuit 120.

The minus terminal of the battery 100 is connected with a minus power line 122 of the second power source circuit 120, and also has an earth (ground) connection to the vehicle body.

The first power source circuit 110 supplies electric power from the battery 100 to the vehicle system 130 and the like.

The first power source circuit 110 includes the plus power line 111, an ignition relay 112, and the like.

The plus power line 111 is a wiring line that connects the plus terminal of the battery 100 to an electric load such as the vehicle system 130.

The ignition relay 112 is an electric relay which is provided partway along the plus power line 111 and which opens or closes in response to the operation of an ignition switch not illustrated that acts as the main power switch of the vehicle.

The minus terminal of the vehicle system 130 configured to receive a supply of electric power from the first power source circuit 110 and the minus terminal of the power source switching circuit 140 have an earth connection to the vehicle body.

The second power source circuit 120 supplies electric power from the battery 100 to the motor 81 of the electric power steering device 1.

The second power source circuit 120 includes the plus power line 121, a minus power line 122, and the like.

The plus power line 121 is a wiring line that connects the plus terminal of the battery 100 to the plus terminal of a driving circuit of the motor 81.

The minus power line 122 is a wiring line that connects the minus terminal of the battery 100 to the minus terminal of the driving circuit of the motor 81.

The vehicle system 130 includes, for example, a plurality of electric loads, including various types of control devices such as an engine control unit configured to centrally control the engine and auxiliary machinery, a transmission control unit configured to control the transmission, a behavior control unit configured to control a brake device of the vehicle and also perform various behavioral controls, an environment recognition unit configured to recognize the environment around the vehicle, and a body integration unit configured to centrally control various electric components; various sensors; and various other electric components.

Some of these control devices are capable of communicating with the electric power steering control unit 90 through, for example, an in-vehicle LAN signal line 131 of a known CAN communication system or the like.

The power source switching circuit 140 switches between a first state in which electric power is supplied from the first power source circuit 110 to the electric power steering control unit 90 and the electric power steering control unit 90 is cut off from the second power source circuit 120, and a second state in which electric power is supplied from the second power source circuit 120 to the electric power steering control unit 90 and the electric power steering control unit 90 is cut off from the first power source circuit 110.

The power source switching circuit 140 includes a relay (electric relay) configured to switch between the above power sources, a microcomputer configured to control the relay, and the like.

In the first embodiment, the power source switching circuit 140 includes a voltage detector configured to detect the voltage of the plus power line 111 of the first power source circuit 110 with respect to the vehicle body (ground) (hereinafter referred to as the voltage of the first power source circuit 110).

Additionally, the power source switching circuit 140 acquires the present operating current of the motor 81 through a signal line 141.

The power source switching circuit 140 selects the second state when the voltage of the first power source circuit 110 is less than or equal to a threshold determined in advance, and otherwise selects the first state. In one embodiment, the threshold may serve as a "predetermined value".

The threshold can be set with consideration for the voltage necessary for the electric power steering control unit 90 to operate normally.

In other words, in the case where the ignition switch is turned off and the ignition relay 112 is disconnected or in the case where a temporary huge voltage drop occurs, such as when driving a starter motor, for example, the electric power steering control unit 90 is supplied with electric power from the second power source circuit 120 temporarily, but in other cases, electric power is supplied from the first power source circuit 110. At this time, the second power source circuit 120 supplies electric power to the motor 81 of the electric power steering device 1.

Effects of the first embodiment described above will be described in comparison to electric power steering devices of Comparative Examples 1 and 2 of the disclosure described below.

Note that in Comparative Examples 1, 2 and the second embodiment described later, members in common with the first embodiment will be denoted by the same reference signs and descriptions thereof are omitted, and the points that differ will be described mainly.

Figure 3:
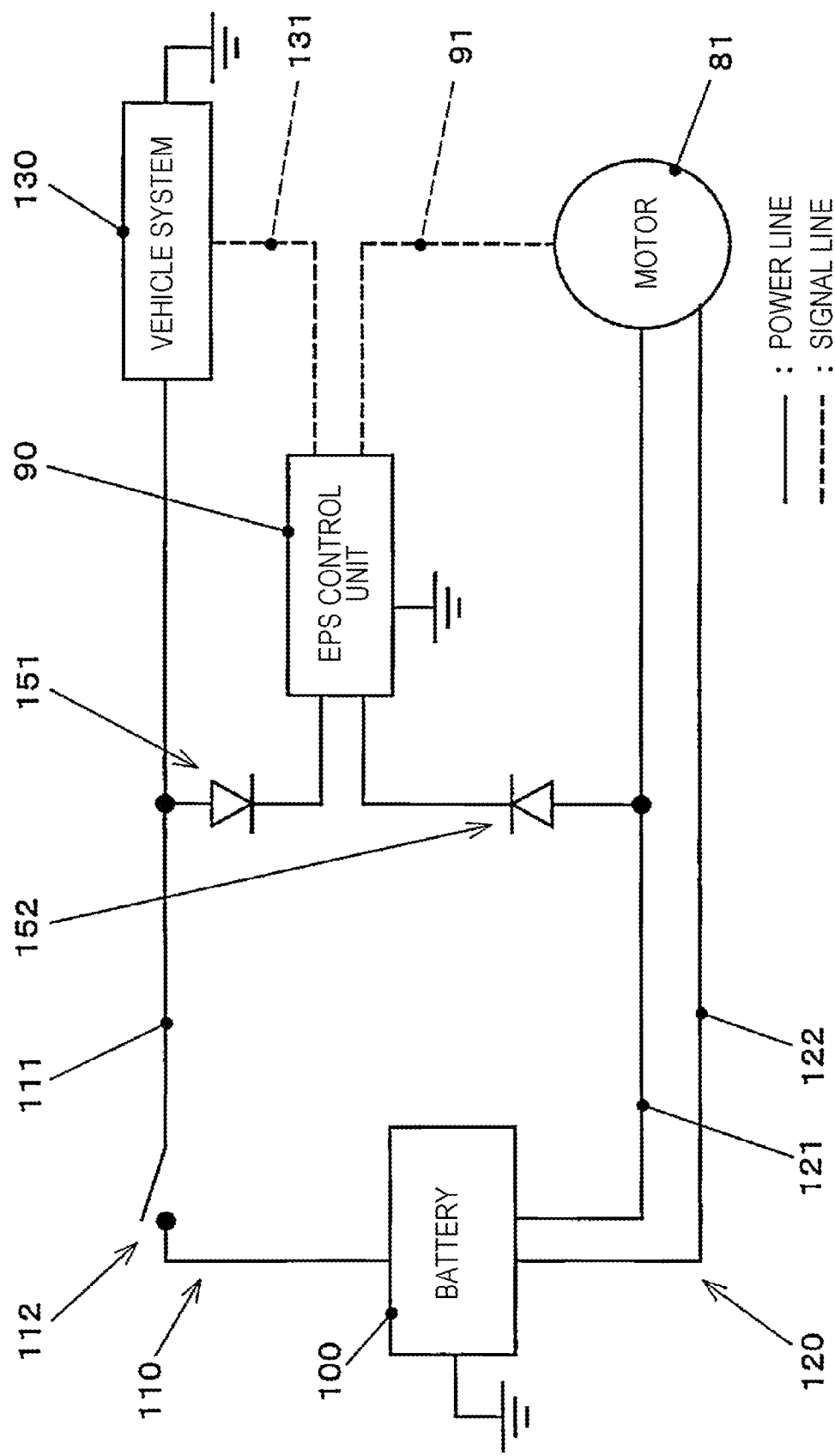
FIG. 3 is a diagram schematically illustrating a circuit configuration in an electric power steering device of Comparative Example 1 of the disclosure.

FIG. 3 is a diagram schematically illustrating a circuit configuration in the electric power steering device of Comparative Example 1 of the disclosure.

In Comparative Example 1, rectifier elements (typically diodes) 151 and 152 are used instead of the power source switching circuit 140 of the first embodiment, and electric power is supplied to the electric power steering control unit 90 from any of the first power source circuit 110 and the second power source circuit 120, which has the higher voltage.

In the case of such a configuration, the source for supplying electric power to the electric power steering control unit 90 is switched successively in response to the reversal of the voltage relationship between the first power source circuit 110 and the second power source circuit 120, which may occur frequently while the vehicle is being driven, and consequently, the voltage supplied from the second power source circuit 120 to the motor 81 switches between a state of large fluctuation and a state of small fluctuation.

For this reason, a state of insufficient control stability may occur in the micro-current region, and feel of steering may deteriorate.

Figure 4:
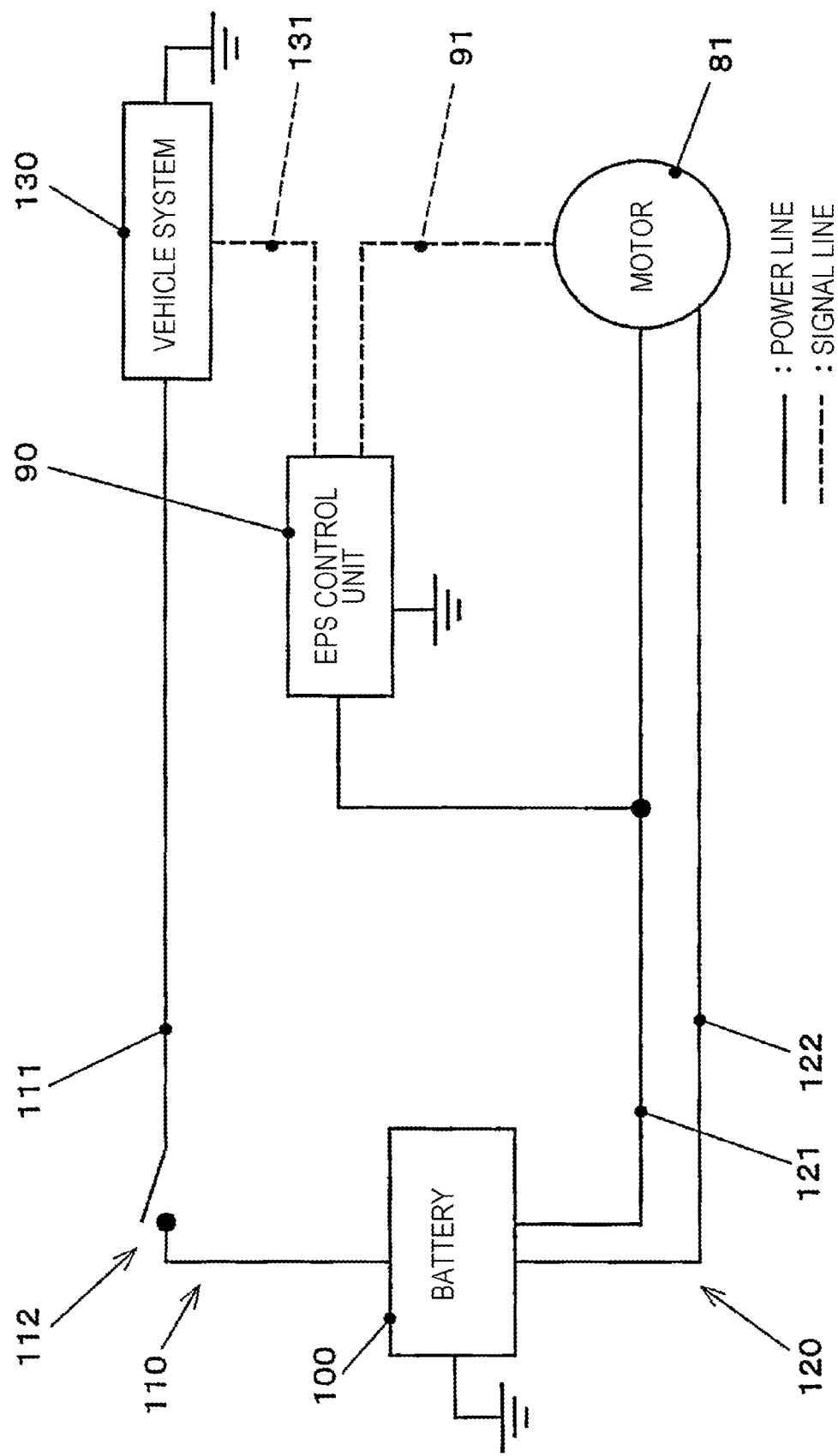
FIG. 4 is a diagram schematically illustrating a circuit configuration in an electric power steering device of Comparative Example 2 of the disclosure.

FIG. 4 is a diagram schematically illustrating a circuit configuration in the electric power steering device of Comparative Example 2 of the disclosure.

In Comparative Example 2, the power source switching circuit 140 of the first embodiment is not provided, and the electric power steering control unit 90 continually receives a supply of electric power through the plus power line 121 of the second power source circuit 120 and the vehicle-body earth connection.

In this case, fluctuations in the voltage of the second power source circuit 120 are unavoidable due to changes in the power consumption by the electric power steering control unit 90, control stability in the micro-current region may be reduced, and the feel of steering may deteriorate.

In contrast, according to the first embodiment described above, the following effects can be obtained.

Voltage variations are unavoidable in the power source circuit configured to supply electric power to the electric power steering control unit 90 due to fluctuations in the electric power consumed by the electric power steering control unit 90 itself, for example, in the case where the power source circuit configured to supply electric power to the electric power steering control unit 90 also supplies electric power to the vehicle system 130, voltage variations in the power source circuit are even more noticeable in association with factors such as fluctuations in the electric power consumed by the vehicle system 130 and the generation of signals when multiple controllers and sensors communicate with each other.

If electric power is supplied to the motor 81 from the first power source circuit 110 in which voltage variations occur in this way, the control stability in the micro-current region may deteriorate and may cause the feel of steering to deteriorate.

With regard to this point, according to an embodiment of the disclosure, the second power source circuit 120 is configured to supply electric power to the motor 81 in the case where the voltage of the first power source circuit 110 is greater than a predetermined value and there is no hindrance to the driving of the electric power steering control unit 90. Accordingly, the influence of voltage fluctuations arising from the electric power steering control unit 90 and the vehicle system 130 can be suppressed to improve the control stability in the micro-current region, and the feel of steering in the range of normal use can be improved to improve the feel of luxury and merchantability of the vehicle.

Moreover, in the case where the voltage of the first power source circuit 110 falls to a predetermined value or less and poses a hindrance to the driving of the electric power steering control unit 90, electric power is supplied from the second power source circuit 120 to the electric power steering control unit 90. Accordingly, the functions of the electric power steering device 1 can be ensured, even if, for example, the main power source of the vehicle is turned off, typically, when the ignition switch of the vehicle is turned off and the ignition relay 112 is disconnected.

Next, a second embodiment of an electric power steering device to which the disclosure is applied will be described.

In the electric power steering device of the second embodiment, the power source switching circuit 140 selects the first state in the case where the operating current of the motor 81 is less than or equal to a preset threshold (as one example, 15 A), and otherwise selects the second state.

However, to keep the electric power steering control unit 90 electrically drivable even when the voltage falls in the first power source circuit 110, in the case where the voltage of the first power source circuit 110 is less than or equal to a predetermined value, the power source switching circuit 140 selects the second state regardless of the operating current of the motor 81.

According to the second embodiment described above, in the case where the operating current of the motor 81 is less than or equal to a predetermined value, it is possible to supply electric power from the second power source circuit 120 to the motor 81, the influence of voltage fluctuations arising from the electric power steering control unit 90 and the vehicle system 130 can be suppressed, the control stability in the micro-current region can be improved, and the feel of steering in the range of normal use can be improved.

Moreover, in the case where the voltage of the first power source circuit 110 falls to a predetermined value or less and poses a hindrance to the driving of the electric power steering control unit 90, electric power is supplied from the second power source circuit 120 to the electric power steering control unit 90. Accordingly, the functions of the electric power steering device 1 can be ensured, even if, for example, the ignition switch of the vehicle is turned off.

The disclosure is not limited to the embodiments described above. Various modifications and changes are possible, and such modifications and changes also belong to the technical scope of the disclosure.

(1) The configurations of the vehicle and the electric power steering device are not limited to the configurations described above and may be changed, as appropriate.

For example, in the embodiments, the electric power steering device is a pinion-assist electric power steering device as an example, but the disclosure is not limited thereto and may also be applied to another type of electric power steering device, such as a column-assist, rack-assist, or double-pinion electric power steering device.

(2) The circuit configurations in the embodiments are examples and may be changed, as appropriate. In addition, settings such as the value of the threshold for switching the power source switching circuit may also be changed, as appropriate.

As described above, according to the disclosure, an electric power steering device with an improved feel of steering in the region of very small motor operating currents can be provided.

The power source switching circuit 140 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the power source switching circuit 140 including the voltage detector and the current detector. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. An electric power steering device comprising:
a motor configured to impart an assist force to a steering device that is to steer a steerable wheel of a vehicle;
a motor controller configured to control an output of the motor;
a first power source circuit configured to supply electric power from a power source to at least one electric load other than the motor controller when a main power source of the vehicle is on;
a second power source circuit configured to supply electric power continually from the power source to the motor;
a power source switching circuit configured to switch between a first state and a second state, the first state being a state in which electric power is supplied from the first power source circuit to the motor controller while the second power source circuit and the motor controller are cut off from one another, the second state being a state in which electric power is supplied from the second power source circuit to the motor controller while the first power source circuit and the motor controller are cut off from one another; and
a voltage detector configured to detect a voltage of the first power source circuit, wherein the power source switching circuit is configured to select the second state in a case where the voltage of the first power source circuit is less than or equal to a predetermined value, and select the first state in cases other than the case.

2. An electric power steering device comprising:
a motor configured to impart an assist force to a steering device that is to steer a steerable wheel of a vehicle;
a motor controller configured to control an output of the motor;
a first power source circuit configured to supply electric power from a power source to at least one electric load other than the motor controller when a main power source of the vehicle is on;
a second power source circuit configured to supply electric power continually from the power source to the motor;
a power source switching circuit configured to switch between a first state and a second state, the first state being a state in which electric power is supplied from the first power source circuit to the motor controller while the second power source circuit and the motor controller are cut off from one another, the second state being a state in which electric power is supplied from the second power source circuit to the motor controller while the first power source circuit and the motor controller are cut off from one another; and
a current detector configured to detect an operating current of the motor, wherein
the power source switching circuit is configured to select the first state in a case where the operating current of the motor is less than or equal to a predetermined value, and select the second state in cases other than the case.

3. The electric power steering device according to claim 2, further comprising:
a voltage detector configured to detect a voltage of the first power source circuit, wherein
in a case where a voltage of the first power source circuit is less than or equal to a predetermined value, the power source switching circuit selects the second state regardless of the operating current of the motor.

4. An electric power steering device comprising:
a motor configured to impart an assist force to a steering device that is to steer a steerable wheel of a vehicle;
a motor controller configured to control an output of the motor;
a first power source circuit configured to supply electric power from a power source to at least one electric load other than the motor controller when a main power source of the vehicle is on;
a second power source circuit configured to supply electric power continually from the power source to the motor;
a power source switching circuit configured to switch between a first state and a second state, the first state being a state in which electric power is supplied from the first power source circuit to the motor controller while the second power source circuit and the motor controller are cut off from one another, the second state being a state in which electric power is supplied from the second power source circuit to the motor controller while the first power source circuit and the motor controller are cut off from one another;
a current detector configured to detect an operating current of the motor; and
a voltage detector configured to detect a voltage of the first power source circuit, wherein
in response to the detected voltage of the first power source circuit being less than or equal to a predetermined value, the power source switching circuit selects the second state.

* * * * *